United States Patent
Wang

(10) Patent No.: US 9,348,454 B2
(45) Date of Patent: May 24, 2016

(54) ELECTRONIC DEVICE WITH TOUCH SCREEN AND METHOD AND SYSTEM FOR PROTECTING SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Yin-Zhan Wang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 199 days.

(21) Appl. No.: 13/867,141

(22) Filed: Apr. 22, 2013

(65) Prior Publication Data
US 2013/0278524 A1 Oct. 24, 2013

(30) Foreign Application Priority Data
Apr. 23, 2012 (CN) .......................... 2012 1 0119703 7

(51) Int. Cl.
*G06F 3/041* (2006.01)
*G06F 3/044* (2006.01)

(52) U.S. Cl.
CPC ............... *G06F 3/0416* (2013.01); *G06F 3/044* (2013.01); *G06F 2203/04108* (2013.01)

(58) Field of Classification Search
CPC .................. G06F 3/0416; G06F 3/044; G06F 2203/04108; G06F 3/041; G06F 3/045; G06F 3/042; G06K 11/06; G08C 21/00
USPC .................. 345/173–176; 178/18.01–18.06
See application file for complete search history.

(56) References Cited

U.S. PATENT DOCUMENTS

| | | | |
|---|---|---|---|
| 2005/0079896 A1* | 4/2005 | Kokko et al. ................... | 455/566 |
| 2009/0237372 A1* | 9/2009 | Kim et al. ...................... | 345/173 |
| 2010/0083137 A1* | 4/2010 | Shin .................... | H04L 12/1822 715/756 |
| 2010/0107099 A1* | 4/2010 | Frazier et al. ................. | 715/765 |
| 2010/0117970 A1* | 5/2010 | Burstrom et al. ............. | 345/173 |
| 2011/0312349 A1* | 12/2011 | Forutanpour ......... | G06F 1/1626 455/466 |
| 2012/0256862 A1* | 10/2012 | Wagner ......................... | 345/173 |

\* cited by examiner

*Primary Examiner* — Pegeman Karimi
(74) *Attorney, Agent, or Firm* — Novak Druce Connolly Bove + Quigg LLP

(57) ABSTRACT

An electronic device comprises a touch screen, a distance determining module, a touch determining module, and a warning control module. The distance determining module determines whether a distance between the touch screen and an object in front of the touch screen is less than or equal to a distance limit. The touch determining module determines whether a touch action is applied to the touch screen within a first predetermined time when the distance between the touch screen and the object is less than or equal to the distance limit. The warning control module controls the electronic device to send a warning to a user when no touch action is applied to the touch screen within the first predetermined time.

8 Claims, 6 Drawing Sheets

ELECTRONIC DEVICE WITH TOUCH SCREEN AND METHOD AND SYSTEM FOR PROTECTING SAME

BACKGROUND

1. Technical Field

The present disclosure relates to an electronic device, a method and a system for protecting the same.

2. Description of Related Art

Portable electronic devices, such as MP3 players, mobile phones, video cameras, and personal digital assistants, may have touch screens serving as input devices. However, when such portable electronic device is put into a pocket of a user with its touch screen facing outwards, the touch screen may be easily damaged by scrapes and impacts, causing loss to the user.

What is needed is to provide a means that can overcome the above-described limitations.

BRIEF DESCRIPTION OF THE DRAWINGS

The components in the drawings are not necessarily drawn to scale, the emphasis instead placed upon clearly illustrating the principles of at least one embodiment. In the drawings, like reference numerals designate corresponding parts throughout the various views, and all the views are schematic.

DETAILED DESCRIPTION

Reference will be made to the drawings to describe certain exemplary embodiments of the present disclosure.

In general, the word "module" and "unit", as used herein, refers to logic embodied in hardware or firmware, or to a recording of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable median include CDs, DVDs, BLU-RAY, flash memory, and hard disk drives.

Figure 1:
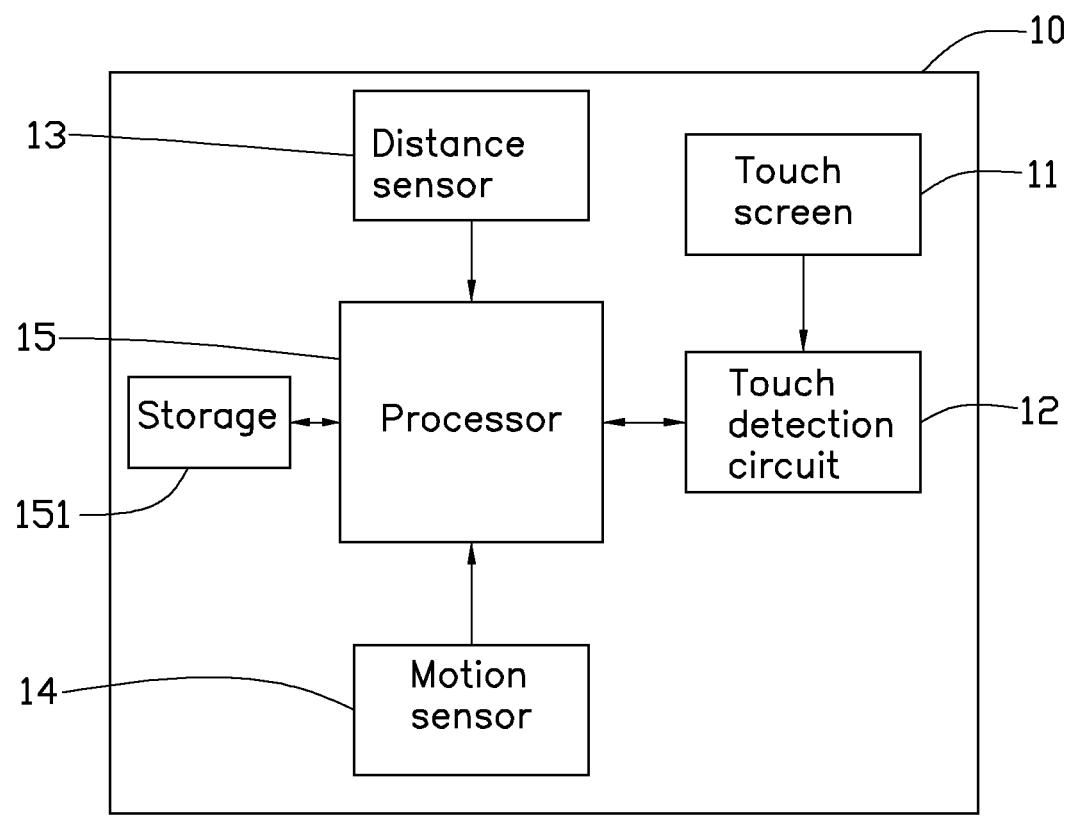
FIG. 1 is a block diagram of an electronic device according to a first embodiment of the present disclosure.

Referring to FIG. 1, a block diagram of an electronic device 10 according to a first embodiment of the present disclosure is shown. The electronic device 10 may be an MP3 player, a mobile phone, a video camera, or a personal digital assistant, and includes a touch screen 11, a touch detection circuit 12, a distance sensor 13, a motion sensor 14, and a processor 15. The touch screen 11 is a capacitive touch screen. The distance sensor 13 measures a distance between the touch screen 11 and an object (such as an internal surface of a pocket of a user) in front of the touch screen 11 and provides a distance detection signal (e.g., the distance between the touch screen 11 and the object) to the processor 15. The touch detection circuit 12 detects touch actions applied to the touch screen 11 (e.g., a finger contacting the touch screen 11) and provides a touch detection signal to the processor 15 according to the touch actions. The motion sensor 14 can be an accelerometer, and is configured for determining whether the electronic device 10 is in a moving state and providing a moving detection signal to the processor 15.

Figure 2:
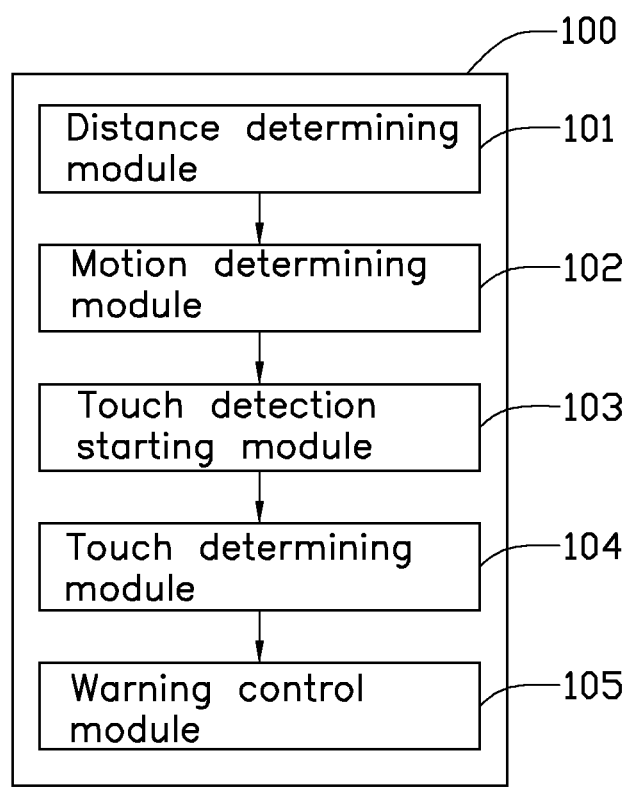
FIG. 2 is a block diagram of a system for protecting the electronic device of FIG. 1.

Referring to FIG. 2, the electronic device 10 can include a storage 151 (e.g., non-volatile memory) that includes a system 100 having one or more programs that are executed by the processor 15. The system 100 includes a distance determining module 101, a motion determining module 102, a touch detection starting module 103, a touch determining module 104, and a warning control module 105.

The distance determining module 101 is configured to determine whether a distance between the touch screen 11 and an object in front of the touch screen 11 is less than or equal to a predetermined distance (distance limit) according to the distance detection signal from the distance sensor 13, and is further configured to determine whether an object which is within the distance limit remains within the distance limit for a first predetermined time. The motion determining module 102 is configured to determine whether the electronic device 10 is in a moving state according to the moving detection signal from the motion sensor 14 when any determination as to the first predetermined time is made. The touch detection starting module 103 is configured to activate the touch detection circuit 12 to detect any touch action applied to the touch screen 11 when the electronic device 10 is in the moving state. The touch determining module 104 is configured to determine whether any touch action is applied to the touch screen 11 within a second predetermined time according to a touch detection signal from the touch detection circuit 12. The warning control module 105 is configured to control the electronic device 10 to send a warning to a user to protect the touch screen 11 when no touch action is applied to the touch screen 11 within the second predetermined time.

The first predetermined time and the second predetermined time may each be five seconds, and the warning applied to the user may include a text warning, an audible warning, or a vibration of the electronic device 10. In one embodiment, the warning includes both a text warning and an audible warning. In another embodiment, the warning includes both a text warning and a vibration warning.

Figure 3:
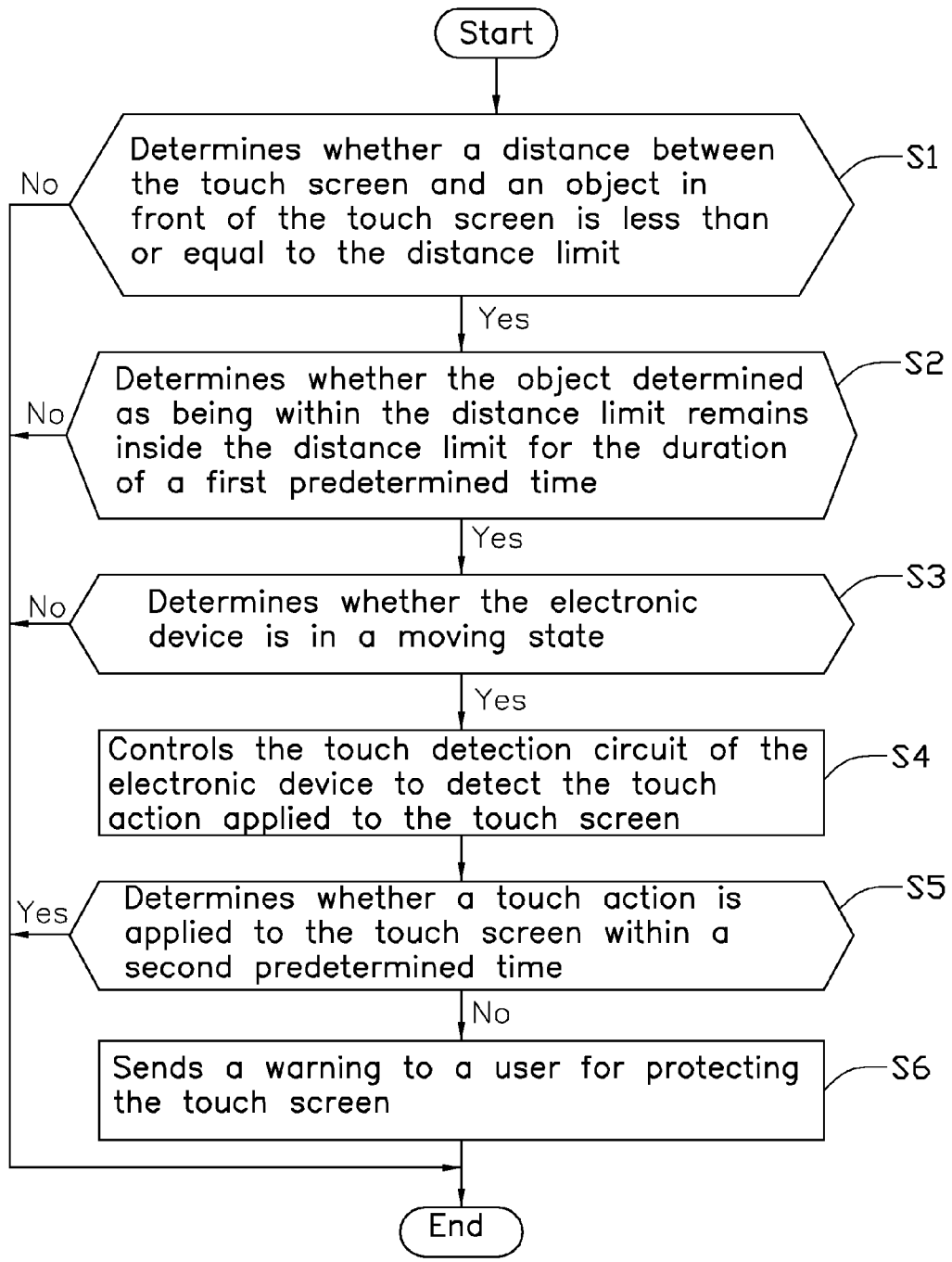
FIG. 3 is a flowchart of a method for protecting the electronic device of FIG. 1.

Referring to FIG. 3, a flowchart of a method for protecting the electronic device 10 is shown. The method can be implemented in the electronic device 10 of FIG. 1 via the system 100 of FIG. 2, and includes:

Step S1, the distance determining module 101 determines whether a distance between the touch screen 11 and an object in front of the touch screen 11 is less than or equal to the distance limit according to the distance detection signal from the distance sensor 13. The distance limit may be substantially zero. If the distance between the touch screen 11 and the object in front of the touch screen 11 is within the distance limit, step S2 is implemented. Otherwise, if the distance between the touch screen 11 and the object in front of the touch screen 11 is not within the distance limit, the procedure terminates.

Step S2, the distance determining module 101 further determines whether the object determined as being within the distance limit remains inside the distance limit for the duration of a first predetermined time, if the duration is greater than the first predetermined time, step S3 is implemented. Otherwise, if the duration is less than the first predetermined time, the procedure terminates. The first predetermined time can be five seconds. In one embodiment, the first predetermined time can be two seconds.

Step S3, the motion determining module 102 determines whether the electronic device 10 is in a moving state according to the moving detection signal from the motion sensor 14 if an object is found to be within the distance limit for longer than the first predetermined time. If the electronic device 10 is in the moving state, step S4 is implemented. Otherwise, if the electronic device 10 is not in the moving state, the procedure terminates.

Step S4, the touch detection starting module 103 activates the touch detection circuit 12 of the electronic device 10 to detect a touch action applied to the touch screen 11 when the electronic device 10 is in the moving state, then the procedure goes to step S5.

Step S5, the touch determining module 104 determines whether a touch action is applied to the touch screen 11 within a second predetermined time, according to the touch detection signal from the touch detection circuit 12. If no touch action is applied to the touch screen 11 within the second predetermined time, step S6 is implemented. Otherwise, if any touch action is applied to the touch screen 11 within the second predetermined time, the procedure terminates. In one embodiment, the second predetermined time can be five seconds. In one embodiment, the second predetermined time also can be two seconds.

Step S6, the warning control module 105 controls the electronic device 10 to send a warning to a user to protect the touch screen 11 when no touch action is applied to the touch screen 11 within the second predetermined time, then the procedure terminates. The warning applied to the user may include a text warning, an audible warning, or a vibration of the electronic device 10. In one embodiment, the warning includes a text warning and an audible warning. In another embodiment, the warning includes a text warning and a vibration warning.

In an alternative embodiment, the step S3 of the method shown in FIG. 3 can be omitted. That is, in step S2, if the duration of time for which an object remains within the distance limit is greater than the first predetermined time, step S4 is implemented, otherwise the procedure terminates.

When the electronic device 10 is put into a pocket of the user with its touch screen 11 facing outward, by use of the system shown in FIG. 2 and the method shown in FIG. 3, a warning for protecting the electronic device 10 is provided to the user, allowing the user to change the position of the electronic device 10 in his pocket or otherwise to avoid the touch screen 11 of the electronic device 10 being damaged. Furthermore, when the electronic device 10 is put into a pocket of the user with its touch screen 11 facing the user, a body of the user may be served as a conductor to apply a touch action to the touch screen 11 via the pocket in the second predetermined time, such that the electronic device 10 would not apply the warning to the user, unnecessary warnings can be avoided.

Figure 4:
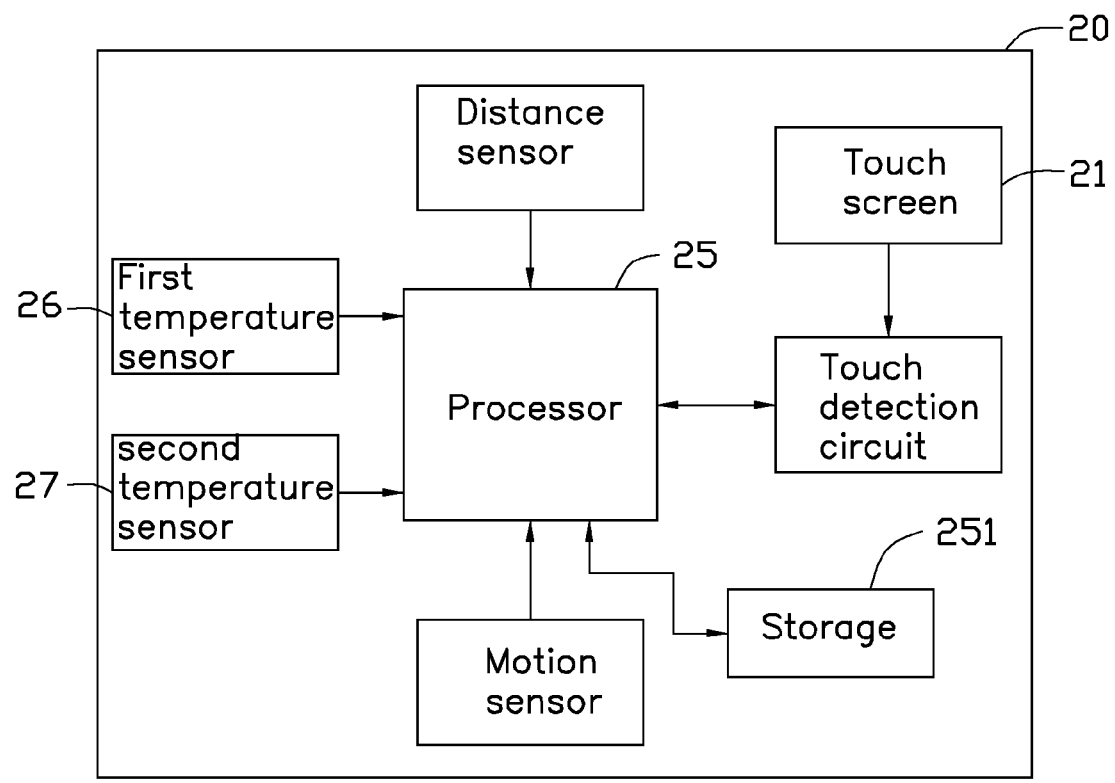
FIG. 4 is a block diagram of an electronic device according to a second embodiment of the present disclosure.

Referring to FIG. 4, a block diagram of an electronic device 20 according to a second embodiment of the present disclosure is shown. The electronic device 20 is similar to the above-described electronic device 10 of the first embodiment, but differs in that the electronic device 20 further includes a first temperature sensor 26 and a second temperature sensor 27. The electronic device 20 may define a first side and an opposite second side. The touch screen 21 is located at the first side. The first temperature sensor 26 detects a first temperature of the first side of the electronic device 20 and provides a first temperature detection signal to the processor 25. The second temperature sensor 27 detects a second temperature of the second side of the electronic device 20 and provides a second temperature detection signal to the processor 25.

Figure 5:
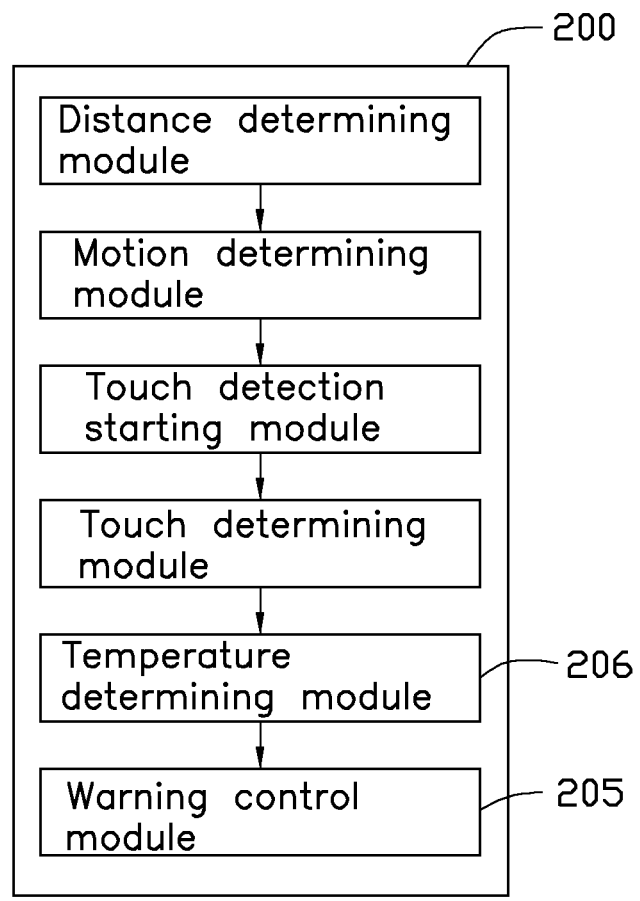
FIG. 5 is a block diagram of a system for protecting the electronic device of FIG. 4.

Referring to FIG. 5, the processor 25 includes a storage 251 and a system 200 for protecting the electronic device 20. The system 200 is similar to the above-described system 100 of the first embodiment, but differs in that the system 200 further includes a temperature determining module 206 configured for determining a difference between the first temperature and the second temperature and whether a difference value between the first and the second temperatures is less than or greater than a predetermined difference value according to the first and the second temperatures. If the first temperature is less than the second temperature, and the difference value between the first and second temperatures is greater than the predetermined difference value, and no touch action is applied to the touch screen 21 within the second predetermined time, the warning control module 205 controls the electronic device 20 to send a warning to a user to protect the touch screen 21. The first temperature may be substantially 36 degrees Celsius and the second temperature may be substantially 34 degrees Celsius, and the predetermined value of the difference may be 2 degrees Celsius for example.

In the second embodiment, because of the temperature determining module 206, when the difference value between the first and the second temperatures is greater than the predetermined difference value and a touch action is applied to the touch screen 21 in the second predetermined time, the warning control module 205 sends the warning to the user for protecting the touch screen 21, some unnecessary warnings may be avoided.

Figure 6:
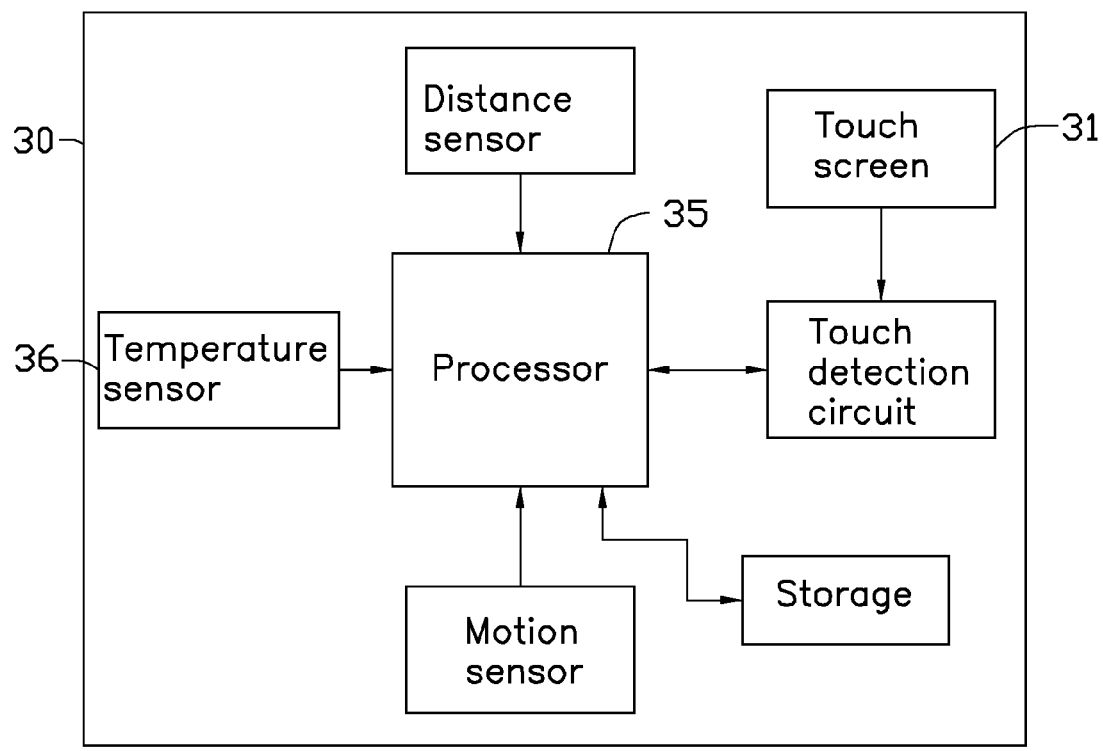
FIG. 6 is a block diagram of an electronic device according to a third embodiment of the present disclosure.

Referring to FIG. 6, a block diagram of an electronic device 30 according to a third embodiment of the present disclosure is shown. The electronic device 30 is similar to the above-described electronic device 20 of the second embodiment, but differs in that the electronic device 30 includes a single temperature sensor 36. The electronic device 30 may define a first side and an opposite second side. The touch screen 31 and the temperature sensor 36 are located at the first side. The temperature sensor 36 detects a temperature of the first side of the electronic device 30 and provides a temperature detection signal to the processor 35. A temperature determining module (such as the temperature determining module 206) determines whether a temperature of the first side of the electronic device 30 is more or less than a predetermined temperature (such as 36 degrees Celsius or 34 degrees Celsius) according to the temperature detection signal of the temperature sensor 36. When the temperature of the first side of the electronic device 30 is less than the predetermined temperature value and no touch action is applied to the touch screen 31 within the second predetermined time, a warning to protect the touch screen 31 of the electronic device 30 is given to the user.

In the third embodiment, because of the temperature determining module, when the temperature of the first side of the electronic device 30 is less than the predetermined temperature value and a touch action is applied to the touch screen 31 within the second predetermined time, the warning control module 205 applies the warning to the user for protecting the touch screen 31, some unnecessary warnings may be avoided.

It is to be further understood that even though numerous characteristics and advantages of preferred and exemplary embodiments have been set out in the foregoing description, together with details of the structures and functions of the embodiments, the disclosure is illustrative only; and changes may be made in detail, especially in the matters of shape, size and arrangement of parts within the principles of the present disclosure to the full extent indicated by the broad general meaning of the terms in which the appended claims are expressed.

What is claimed is:

1. A method for protecting an electronic device with a touch screen, comprising:
   detecting a distance between the touch screen and an object in front of the touch screen;
   determining whether the distance is less than or equal to a distance limit;
   determining whether a touch action is applied to the touch screen in a first predetermined time when the distance is less than or equal to the distance limit;
   determining whether the electronic device is put into a pocket of a user with its touch screen facing outwardly when no touch action is applied to the touch screen within the first predetermined time;
   sending a warning to a user when the electronic device is put into the pocket of the user with its touch screen facing outwardly; and
   determining whether the object remains within the distance limit for duration of a second predetermined time,
   wherein if a duration of time of the object remaining within the distance limit is greater than the second predetermined time, determining whether the touch action is applied to the touch screen within the first predetermined time;
   wherein the first predetermined time and the second predetermined time have equal lengths.

2. The method of claim 1, further comprising:
   determining whether the electronic device is in a moving state,
   wherein if the duration of time of the object remaining within the distance limit is greater than a second predetermined time and the electronic device is in the moving state, whether the touch action is applied to the touch screen in the first predetermined time is determined.

3. The method of claim 2, wherein the first predetermined time and the second predetermined time are five seconds.

4. A system for protecting an electronic device with a touch screen, comprising:
   a distance determining module determining whether a distance between the touch screen and an object in front of the touch screen is less than or equal to a distance limit and determining whether the object determined as being within the distance limit remains inside the distance limit for the duration of a second predetermined time;
   a touch determining module determining whether a touch action is applied to the touch screen within a first predetermined time when the distance between the touch screen and the object is less than or equal to the distance limit and determining whether the touch action is applied to the touch screen in the first predetermined time when the duration of time of the object remaining within the distance limit is greater than the second predetermined time; and
   a warning control module controlling the electronic device to send a warning to a user when no touch action is applied to the touch screen within the first predetermined time.

5. The system of claim 4, further comprising a motion determining module determining whether the electronic device is in a moving state, the touch determining module determining whether the touch action is applied to the touch screen within the first predetermined time when the duration of time of the object remaining within the distance limit is greater than the second predetermined time and the electronic device is in the moving state.

6. The system of claim 5, further comprising a touch detection starting module activating the electronic device to detect the touch action applied to the touch screen when the duration of time of the object remaining within the distance limit is greater than the second predetermined time and the electronic device is in the moving state.

7. An electronic device, comprising:
   a touch screen;
   a processor;
   a distance sensor measuring a distance between the touch screen and an object in front of the touch screen and providing a distance detection signal to the processor;
   a touch detection circuit detecting touch actions applied to the touch screen and providing a touch detection signal to the processor; and
   a system for protecting the electronic device having one or more programs stored in a storage and executed by the processor, the system comprising:
   a distance determining module determining whether a distance between the touch screen and an object in front of the touch screen is less than or equal to a distance limit;
   a touch determining module determining whether a touch action is applied to the touch screen within a first predetermined time when the distance is less than or equal to the distance limit; and
   a warning control module controlling the electronic device to send a warning to a user when no touch action is applied to the touch screen within the first predetermined time.

8. The electronic device of claim 7, further comprising a motion sensor determining whether the electronic device is in a moving state, the touch determining module determining whether the touch action is applied to the touch screen within the first predetermined time when the object determined as being within the distance limit remains inside the distance limit for the duration of a second predetermined time and the electronic device is in the moving state.

* * * * *